(12) United States Patent
Bregman et al.

(10) Patent No.: US 10,977,157 B2
(45) Date of Patent: Apr. 13, 2021

(54) ENHANCED CONTINUOUS INTEGRATION (CI)/CONTINUOUS DELIVERY (CD) BUILD SCRIPT DEBUGGING ENVIRONMENT

(71) Applicant: Red Hat, Inc., Raleigh, NC (US)

(72) Inventors: Arie Bregman, Raanana (IL); Nir Magnezi, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 200 days.

(21) Appl. No.: 16/363,125

(22) Filed: Mar. 25, 2019

(65) Prior Publication Data
US 2020/0310943 A1    Oct. 1, 2020

(51) Int. Cl.
*G06F 11/36* (2006.01)
*G06F 9/54* (2006.01)

(52) U.S. Cl.
CPC ............ *G06F 11/3632* (2013.01); *G06F 9/54* (2013.01); *G06F 11/3664* (2013.01)

(58) Field of Classification Search
None
See application file for complete search history.

(56) References Cited

U.S. PATENT DOCUMENTS

| 8,037,453 | B1 * | 10/2011 | Zawadzki | G06F 8/71 717/123 |
| 9,207,931 | B2 | 12/2015 | Fox et al. | |
| 10,061,578 | B2 | 8/2018 | Walsh et al. | |
| 2001/0005852 | A1 * | 6/2001 | Bogle | G06F 9/45512 718/102 |
| 2011/0239192 | A1 * | 9/2011 | Feigen | G06F 8/71 717/123 |
| 2014/0344625 | A1 * | 11/2014 | Thatte | G06F 11/3636 714/38.1 |

(Continued)

FOREIGN PATENT DOCUMENTS

CN            109213518 A    *  1/2019

OTHER PUBLICATIONS

Author Unknown, "Debugger Extension," code.visualstudio.com/api/exttension-guides/debugger-extension, accessed on Jan. 28, 2019, Microsoft, 13 pages.

(Continued)

*Primary Examiner* — Ryan D. Coyer
(74) *Attorney, Agent, or Firm* — Withrow & Terranova, PLLC

(57) ABSTRACT

Providing an enhanced continuous integration (CI)/continuous delivery (CD) build script debugging environment is disclosed. In one example, the CI/CD build script debugging environment inserts a breakpoint within a CI/CD build script that includes one or more build script steps. During execution of the CI/CD build script within the CI/CD build script debugging environment, execution is paused at the breakpoint, and a language-specific debugging environment suitable for debugging the next build script step is automatically identified and launched. Some examples may also provide that the CI/CD build script debugging environment allows the user to resume execution of the CI/CD build script within the CI/CD build script debugging environment without further pauses, and/or to "step over" a build script step by executing the build script step within the CI/CD build script debugging environment without launching a language-specific debugging environment.

20 Claims, 6 Drawing Sheets

(56) References Cited

U.S. PATENT DOCUMENTS

2018/0196731 A1    7/2018  Moorthi et al.

OTHER PUBLICATIONS

Author Unknown, "Improved debugging for complex C/C++ and HPC applications," blog.klocwork.com/dynamic-analysis/improved-debugging-for-complex-cc-and-hpc-applications/, accessed on Jan. 28, 2019, Rogue Wave Software, Inc., 4 pages.
Branscombe, Mary, "Microsoft Draft Offers Kubernetes Support for Developers," May 31, 2017, The New Stack, 11 pages.
Krishnamurthy, Sandeep, et al., "MXNet Developer Setup on Mac," cwiki.apache.org/confluence/display/MXNET/MXNet+Developer+Setup+on+Mac, accessed on Jan. 28, 2019, Apache Software Foundation, 10 page.

* cited by examiner

ENHANCED CONTINUOUS INTEGRATION (CI)/CONTINUOUS DELIVERY (CD) BUILD SCRIPT DEBUGGING ENVIRONMENT

BACKGROUND

Continuous integration (CI) refers to a software development methodology that attempts to minimize issues that may be encountered when integrating multiple source code modifications into a common code base by performing such integrations more frequently. A complementary practice is continuous delivery (CD), which extends CI by ensuring that the common code base is always in a deployable state at any given time, and which may include automated building, testing, and releasing of software. Implementing the CI/CD methodologies often involves executing CI/CD build scripts that automate operations for merging source code changes into the common code base, performing unit and integration tests, measuring performance, and/or generating documentation, as non-limiting examples.

SUMMARY

The examples disclosed herein include providing an enhanced continuous integration (CI)/continuous delivery (CD) build script debugging environment. The CI/CD build script debugging environment enables debugging of a CI/CD build script that may invoke build script steps based on different programming languages (e.g., Python, Ruby, Java, and the like, as non-limiting examples) and using different language-specific debugging environments. In some examples, the CI/CD build script debugging environment allows a user to insert a breakpoint within a CI/CD build script that includes one or more build script steps. When the CI/CD build script is executed within the CI/CD build script debugging environment, execution is paused at the breakpoint, and a language-specific debugging environment suitable for debugging the next build script step following the breakpoint is automatically identified and launched. The next build script step may then be executed within the language-specific debugging environment. In some examples, after the execution of the next build script step within the language-specific debugging environment is complete, the execution of the CI/CD build script within the CI/CD build script debugging environment pauses at a build script step subsequent to the next build script step. Some examples may also provide that the CI/CD build script debugging environment allows the user to resume execution of the CI/CD build script within the CI/CD build script debugging environment without further pauses, and/or to "step over" a particular build script step by executing the build script step within the CI/CD build script debugging environment without launching a corresponding language-specific debugging environment.

In one example, a method is provided that includes inserting, by a processor device, a breakpoint into a CI/CD build script within a CI/CD build script debugging environment, the CI/CD build script comprising one or more build script steps. The method further includes detecting the breakpoint during execution of the CI/CD build script within the CI/CD build script debugging environment. The method also includes pausing the execution of the CI/CD build script within the CI/CD build script debugging environment at the breakpoint. The method additionally includes automatically identifying a language-specific debugging environment for a next build script step of the one or more build script steps immediately following the breakpoint. The method further includes launching the language-specific debugging environment for the next build script step.

In another example, a computing device is provided. The computing device includes a system memory, and a processor device coupled to the system memory to insert a breakpoint into a CI/CD build script within a CI/CD build script debugging environment, the CI/CD build script comprising one or more build script steps. The processor device is further to detect the breakpoint during execution of the CI/CD build script within the CI/CD build script debugging environment. The processor device is also to pause the execution of the CI/CD build script within the CI/CD build script debugging environment at the breakpoint. The processor device is additionally to automatically identify a language-specific debugging environment for a next build script step of the one or more build script steps immediately following the breakpoint. The processor device is further to launch the language-specific debugging environment for the next build script step.

In another example, a computer program product is provided. The computer program product is stored on a non-transitory computer-readable storage medium and includes instructions to cause a processor device to insert a breakpoint into a CI/CD build script within a CI/CD build script debugging environment, the CI/CD build script comprising one or more build script steps. The computer program product further includes instructions to cause the processor device to detect the breakpoint during execution of the CI/CD build script within the CI/CD build script debugging environment. The computer program product also includes instructions to cause the processor device to pause the execution of the CI/CD build script within the CI/CD build script debugging environment at the breakpoint. The computer program product additionally includes instructions to cause the processor device to automatically identify a language-specific debugging environment for a next build script step of the one or more build script steps immediately following the breakpoint. The computer program product further includes instructions to cause the processor device to launch the language-specific debugging environment for the next build script step.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
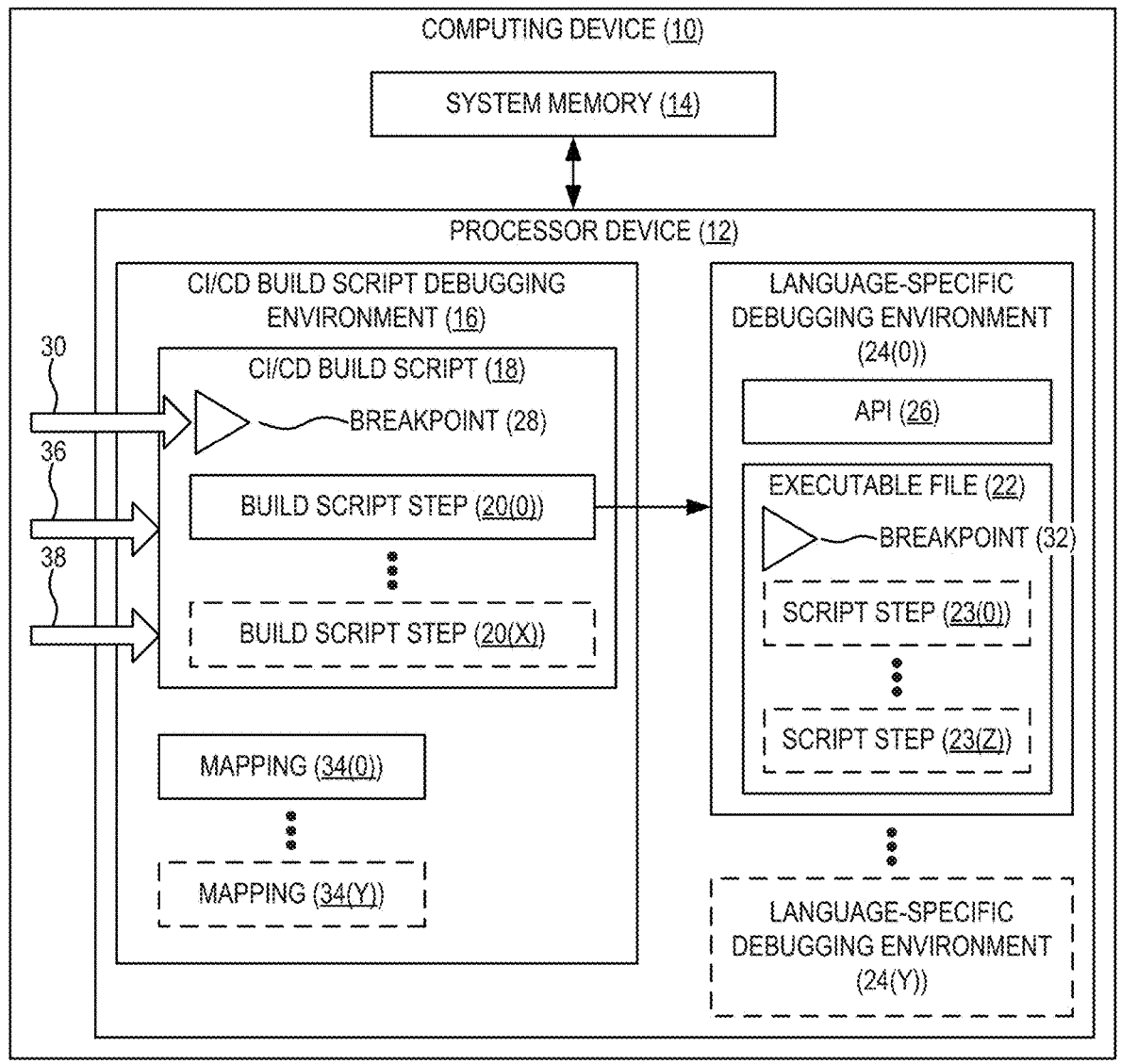
FIG. 1 is a block diagram of a computing device including a processor device providing a continuous integration (CI)/continuous delivery (CD) build script debugging environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Continuous integration (CI) and continuous delivery (CD) are complementary software development methodologies for rapidly and accurately integrating software modifications (e.g., new software code for adding features and/or edited software code for fixing known issues) into a software code base, and preparing the code base for deployment into a production environment. In particular, CI refers to a software engineering practice in which code is copied from a shared code base, modified to add new features and/or to correct known issues, and then re-integrated into the shared code base more frequently (e.g., several times a day, as a non-limiting example). CI helps to minimize divergence of the shared code base (and the associated integration problems that may result) in the interim between copying the code from the shared code base and re-integrating the modified code back into the shared code base. CD extends the methodology of CI to further involve preparing the shared code base for deployment in short, frequent cycles. In this manner, CD ensures that the shared code base produced by CI is always in a deployable state at any given time.

The CI/CD methodologies may make extensive use of automation to perform tasks such as merging source code changes into the common code base, performing unit and integration tests, measuring performance, and/or generating documentation, as non-limiting examples. One conventional approach employs CI/CD build scripts, which are shell scripts for executing one or more build script steps in sequence. Each build script step in the CI/CD build script represents a command for executing an associated executable file, external to the CI/CD build script itself, to carry out one step of the CI/CD build process. Each associated executable file may be a binary executable, or may be another script file containing source code that is interpreted or compiled and then executed when the corresponding build script step in the CI/CD build script is executed.

Because each executable file is external to and separate from the CI/CD build script, the executable file may be implemented using any one of a variety of programming languages and/or execution environments, runtimes, or virtual machines. For example, a single CI/CD build script may execute a series of build script steps to populate resources using an Ansible playbook, run a Python script to query a database, and then run a Java test framework as part of performing the build. While this ability to use multiple languages and runtimes provides great flexibility, it also presents challenges in debugging the CI/CD build script and its constituent build script steps. Developers may have to resort to techniques such as manually inserting commands to pause the CI/CD build script (i.e., "infinite sleep"), or saving or printing log files in an attempt to gain more insight into the state of execution at a given point.

In this regard, the examples disclosed herein provide an enhanced CI/CD build script debugging environment that enables debugging of a CI/CD build script comprising build script steps that may use different programming languages and associated language-specific debugging environments. The CI/CD build script debugging environment allows insertion of a breakpoint within a CI/CD build script that includes one or more build script steps. When execution of the CI/CD build script within the CI/CD build script debugging environment reaches the breakpoint, execution is paused, and a language-specific debugging environment (e.g., a debugging environment already installed on the computing device running the CI/CD build script debugging environment) suitable for debugging the next build script step following the breakpoint is automatically identified and launched. The next build script step may then be executed within the language-specific debugging environment. After the execution of the next build script step within the language-specific debugging environment is complete, the execution of the CI/CD build script within the CI/CD build script debugging environment may allow a user to pause at a build script step subsequent to the next build script step, resume execution of the CI/CD build script within the CI/CD build script debugging environment without further pauses, and/or "step over" a particular build script step by executing a build script step within the CI/CD build script debugging environment without launching a language-specific debugging environment. In this manner, the CI/CD build script debugging environment enables debugging to be performed more efficiently, and provides a more fluid and intuitive debugging experience for a user by removing the need for the user to resort to manual debugging techniques.

FIG. 1 is a block diagram of a computing device 10 that includes a processor device 12 providing a CI/CD build script debugging environment 16 in which examples disclosed herein may be practiced. The computing device 10 includes a system memory 14 to which the processor device 12 is coupled, and which may comprise, as a non-limiting example, a double-rate dynamic random access memory (DRAM) (DDR). The processor device 12 provides the CI/CD build script debugging environment 16 for debugging CI/CD build scripts such as the CI/CD build script 18. The CI/CD build script debugging environment 16 and the functionality provided thereby may be implemented as a graphical user interface (GUI) or as a command-line interface (CLI), as non-limiting examples.

As seen in FIG. 1, the CI/CD build script 18 to be executed within the CI/CD build script debugging environment 16 contains one or more build script steps 20(0)-20(X). Each of the one or more build script steps 20(0)-20(X) represents a command for executing an associated executable file, such as the executable file 22, that is external to the CI/CD build script 18 itself, and that carries out one step of a CI/CD build process. The executable file 22 may be a binary executable, or may be another script file containing source code that is interpreted or compiled and then executed when the corresponding build script step (the build script step 20(0), in the example of FIG. 1) in the CI/CD build script 18 is executed. For example, the executable file 22 may be an Ansible playbook, a Python script, a Java executable, or the like, as non-limiting examples. The executable file 22 in the example of FIG. 1 includes a plurality of script steps 23(0)-23(Z).

The processor device 12 also provides one or more language-specific debugging environments 24(0)-24(Y) that correspond to one or more programming languages used by the one or more build script steps 20(0)-20(X). It is to be understood that each of the language-specific debugging environment(s) 24(0)-24(Y) is installed on the computing device 10 and/or otherwise made available prior to execution of the CI/CD build script 18 within the CI/CD build script debugging environment 16, and is launchable by the CI/CD build script debugging environment 16 using conventional techniques. In some examples, one or more of the language-specific debugging environment(s) 24(0)-24(Y) may provide an application programming interface (API), such as the API 26, through which the CI/CD build script debugging environment 16 may control operations of the language-specific debugging environment(s) 24(0)-24(Y).

Upon starting a debugging session, the CI/CD build script debugging environment 16 inserts a breakpoint 28 within the CI/CD build script 18. In the example of FIG. 1, the breakpoint 28 is inserted immediately prior to the build script step 20(0). However, it is to be understood that the breakpoint 28 may be inserted prior to any of the build script steps 20(0)-20(X) within the CI/CD build script 18. In some examples, the location of the breakpoint 28 may be indicated by a user input 30, and the CI/CD build script debugging environment 16 in such examples may insert the breakpoint 28 responsive to the user input 30.

To begin debugging, the CI/CD build script 18 is executed within the CI/CD build script debugging environment 16. Upon detecting the breakpoint 28 within the CI/CD build script 18, the CI/CD build script debugging environment 16 pauses execution of the CI/CD build script 18 at the breakpoint 28. The CI/CD build script debugging environment 16 then automatically identifies one of the language-specific debugging environments 24(0)-24(Y) for the next build script step 20(0) (i.e., the language-specific debugging environment 24(0), in the example of FIG. 1) immediately following the breakpoint 28. In some examples, the automatic identification of the language-specific debugging environment 24(0) for the next build script step 20(0) may be based on one or more characteristics of the executable file 22 corresponding to the next build script step 20(0). For instance, if the executable file 22 is a binary executable, the automatic identification of the language-specific debugging environment 24(0) for the next build script step 20(0) may be based on a binary examination of the executable file 22 to determine which of the language-specific debugging environments 24(0)-24(Y) is appropriate for debugging. Similarly, the identification of the automatic identification of the language-specific debugging environment 24(0) for the next build script step 20(0) in some examples may be based on a code scan of the executable file 22 and/or a suffix of the executable file 22.

After automatically identifying the language-specific debugging environment 24(0) for the next build script step 20(0), the CI/CD build script debugging environment 16 launches the language-specific debugging environment 24(0). The next build script step 20(0) may then execute within the language-specific debugging environment 24(0). In some examples, executing the next build script step 20(0) within the language-specific debugging environment 24(0) may include inserting a breakpoint 32 at the beginning of the executable file 22 corresponding to the next build script step 20(0) within the language-specific debugging environment 24(0). This has the effect of automatically causing the language-specific debugging environment 24(0) to pause execution of the executable file 22 before the first script step 23(0) is carried out, allowing the user to step through the executable file 22.

Some examples may provide that the CI/CD build script debugging environment 16 may insert the breakpoint 32 into the executable file 22 within the language-specific debugging environment 24(0) using the API 26 exposed by the language-specific debugging environment 24(0). According to some examples, the CI/CD build script debugging environment 16 may maintain one or more mappings 34(0)-34(Y), each of which serves to map one of the language-specific debugging environments 24(0)-24(Y) to a corresponding breakpoint syntax (e.g., for adding and/or manipulating breakpoints within the language-specific debugging environment(s) 24(0)-24(Y), as a non-limiting example). In such examples, the CI/CD build script debugging environment 16 may insert the breakpoint 32 into the executable file 22 within the language-specific debugging environment 24(0) based on one of the mappings 34(0)-34(Y) corresponding to the language-specific debugging environment 24(0).

Once the execution of the next build script step 20(0) within the language-specific debugging environment 24(0) is complete, the execution of the CI/CD build script 18 continues within the CI/CD build script debugging environment 16. Some examples may provide that the CI/CD build script debugging environment 16 pauses execution of the CI/CD build script 18 at a build script step subsequent to the build script step 20(0) (i.e., the build script step 20(X) in FIG. 1). The user may then choose to "step into" the build script step 20(X) by repeating the operations described above for launching a language-specific debugging environment 24(0)-24(Y) to execute the build script step 20(X). In some examples, the CI/CD build script debugging environment 16 may resume execution of the CI/CD build script 18 within the CI/CD build script debugging environment without any further pauses (e.g., responsive to a user input 36). According to some examples, the CI/CD build script debugging environment 16 may allow a user to "step over" the build script step 20(X) by executing the build script step 20(X) without launching a corresponding language-specific debugging environment 24(0)-24(Y) (e.g., responsive to a user input 38).

The utility of the CI/CD build script debugging environment 16 of FIG. 1 may be illustrated by an example use case. Assume that the CI/CD build script 18 includes four build script steps 20(0)-20(3). The build script steps 20(0) and 20(2) each involves execution of different Python scripts, while the build script step 20(1) executes a Ruby script and the build script step 20(3) executes an Ansible playbook. The processor device 12 provides three language-specific debugging environments 24(0)-24(2) for debugging Python scripts, Ruby scripts, and Ansible playbooks, respectively.

Upon executing the CI/CD build script 18 within the CI/CD build script debugging environment 16, the user may insert the breakpoint 28 prior to the first build script step 20(0), causing execution to pause at the build script step 20(0) when the CI/CD build script debugging environment 16 detects the breakpoint 28. The CI/CD build script debugging environment 16 then automatically identifies the build script step 20(0) as executing a Python script, and accordingly launches the language-specific debugging environment 24(0). The build script step 20(0) may then execute within the language-specific debugging environment 24(0), where the user can make use of the native debugging features provided by the language-specific debugging environment 24(0). Upon completion of the execution of the build script step 20(0) within the language-specific debugging environment 24(0), the execution of the CI/CD build script 18 continues within the CI/CD build script debugging environment 16. There, the user may opt to "step into" the next build script step 20(1), in which case the CI/CD build script debugging environment 16 would automatically identify the build script step 20(1) as executing a Ruby script and automatically launch the language-specific debugging environment 24(1). The user may also opt to "step over" the build script step 20(1) by executing the build script step 20(1) without launching the language-specific debugging environment 24(1), or may choose to resume execution of the CI/CD build script 18 without any further pauses.

Figure 2A:
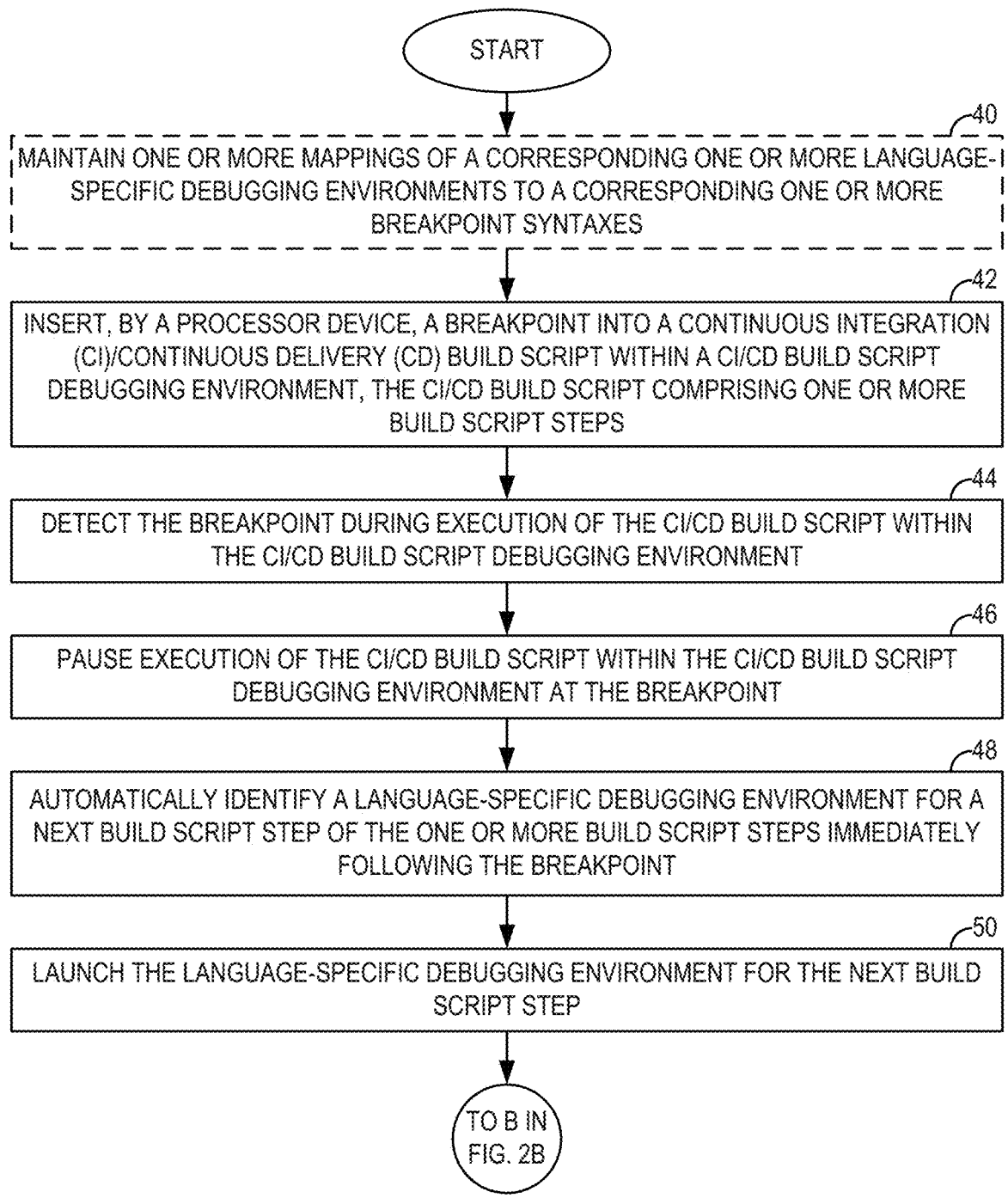
FIGS. 2A and 2B are flowcharts of a method for providing an enhanced CI/CD build script debugging environment according to one example.
Figure 2B:
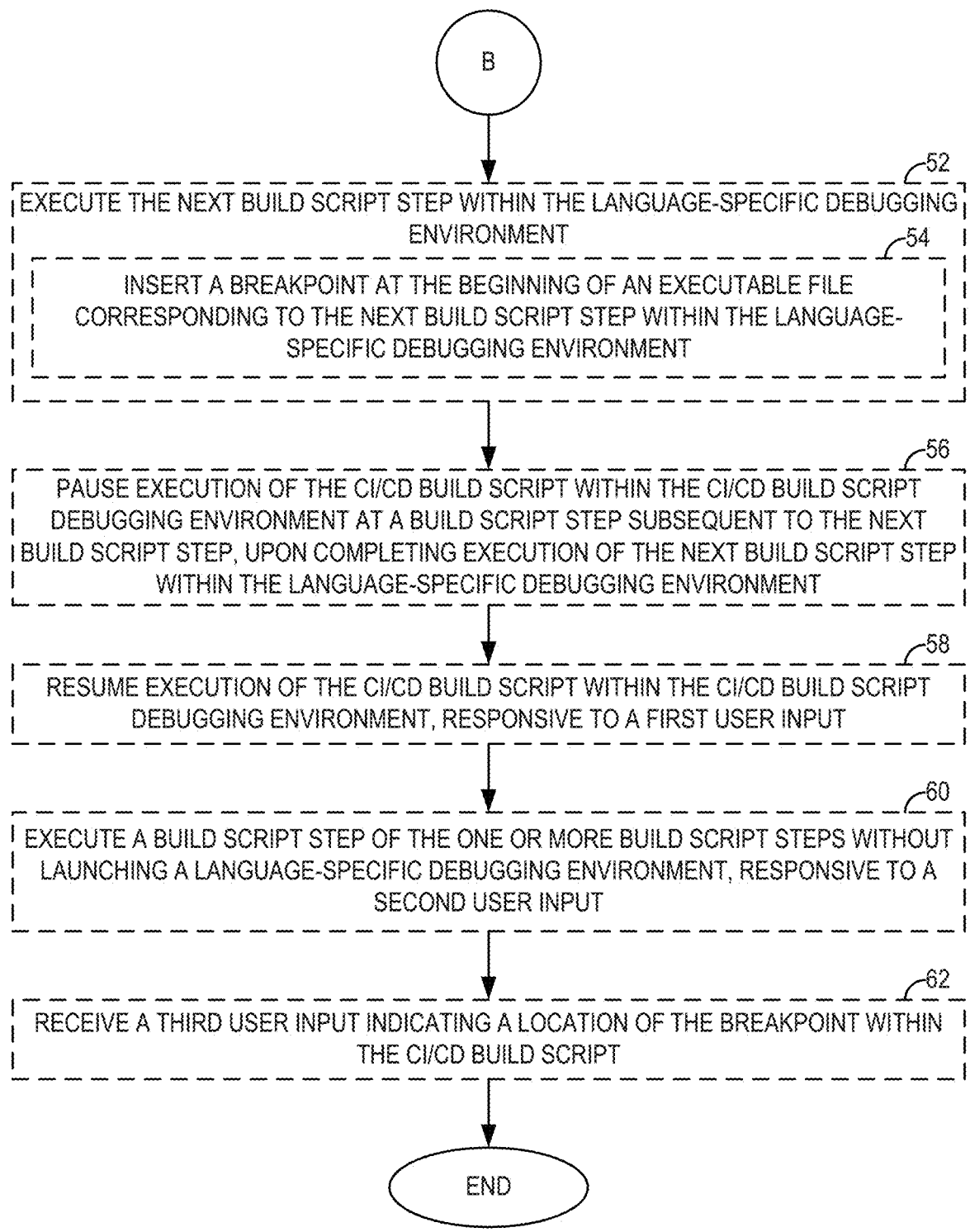

FIGS. 2A and 2B are flowcharts of a method for providing the CI/CD build script debugging environment 16 of FIG. 1 according to one example. For the sake of clarity, elements of FIG. 1 are referenced in describing the operations of FIGS. 2A and 2B. It is to be understood that some operations illustrated in FIGS. 2A and 2B may be carried out in an order different from that illustrated in FIGS. 2A and 2B.

In some examples, operations in FIG. 2A begin with the processor device 12 of FIG. 1 maintaining one or more mappings 34(0)-34(Y) of a corresponding one or more language-specific debugging environments 24(0)-24(Y) to a corresponding one or more breakpoint syntaxes (block 40). The processor device 12 inserts the breakpoint 28 into the CI/CD build script 18 within the CI/CD build script debugging environment 16, the CI/CD build script 18 comprising one or more build script steps 20(0)-20(X) (block 42). The processor device 12 then detects the breakpoint 28 during execution of the CI/CD build script 18 within the CI/CD build script debugging environment 16 (block 44).

The processor device 12 pauses execution of the CI/CD build script 18 within the CI/CD build script debugging environment 16 at the breakpoint 28 (block 46). The processor device 12 then automatically identifies the language-specific debugging environment 24(0) for the next build script step 20(0) of the one or more build script steps 20(0)-20(X) immediately following the breakpoint 28 (block 48). The processor device 12 launches the language-specific debugging environment 24(0) for the next build script step 20(0) (block 50). Processing then resumes at block 52 of FIG. 2B.

Turning now to FIG. 2B, the processor device 12 according to some examples executes the next build script step 20(0) within the language-specific debugging environment 24(0) (block 52). In some examples, operations of block 52 for executing the next build script step 20(0) within the language-specific debugging environment 24(0) may include inserting the breakpoint 32 at the beginning of the executable file 22 corresponding to the next build script step 20(0) within the language-specific debugging environment 24(0) (block 54).

Some examples may provide that, after execution of the next build script step 20(0) within the language-specific debugging environment 24(0), the processor device 12 may pause execution of the CI/CD build script 18 within the CI/CD build script debugging environment 16 at a build script step 20(X) subsequent to the next build script step 20(0) upon completing execution of the next build script step 20(0) within the language-specific debugging environment 24(0) (block 56). In some examples, the processor device 12 may resume execution of the CI/CD build script 18 within the CI/CD build script debugging environment 16, responsive to a first user input 36 (block 58). According to some examples, the processor device 12 may execute a build script step 20(X) of the one or more build script steps 20(0)-20(X) without launching a language-specific debugging environment 24(0)-24(Y), responsive to a second user input 38 (block 60). Some examples may provide that the processor device 12 may receive a third user input 30 indicating a location of the breakpoint 28 within the CI/CD build script 18 (block 62).

Figure 3:
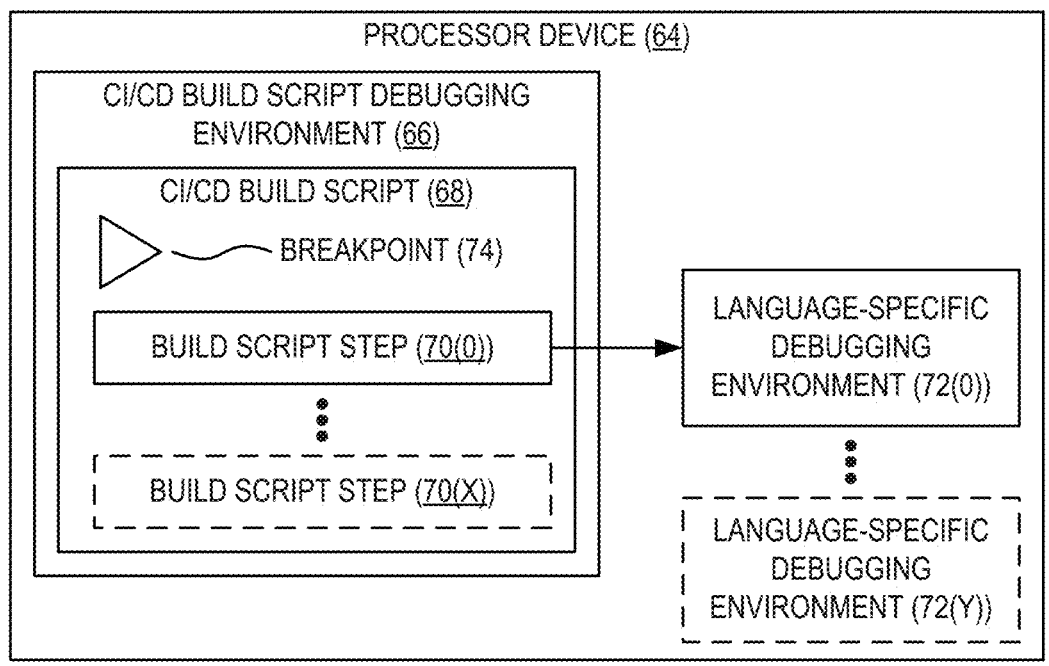
FIG. 3 is a simplified diagram of the processor device illustrated in FIG. 1 according to another example.

FIG. 3 is a simplified diagram of the processor device 12 illustrated in FIG. 3 according to another example. As seen in FIG. 3, a processor device 64 provides a CI/CD build script debugging environment 66 for debugging CI/CD build scripts such as the CI/CD build script 68. The CI/CD build script debugging environment 66 and the functionality provided thereby may be implemented as a graphical user interface (GUI) or as a command-line interface (CLI), as non-limiting examples. The CI/CD build script 68 to be executed within the CI/CD build script debugging environment 66 contains one or more one or more build script steps 70(0)-70(X). Each of the one or more build script steps 70(0)-70(X) represents a command for executing an associated executable file that is external to the CI/CD build script 68 itself, and that carries out one step of a CI/CD build process. The processor device 64 also provides one or more language-specific debugging environments 72(0)-72(Y) that correspond to one or more programming languages used by the one or more build script steps 70(0)-70(X). It is to be understood that each of the language-specific debugging environments 72(0)-72(Y) is installed or otherwise made available prior to execution of the CI/CD build script 68 within the CI/CD build script debugging environment 66, and is launchable by the CI/CD build script debugging environment 66 using conventional techniques.

Upon starting a debugging session, the CI/CD build script debugging environment 66 inserts a breakpoint 74 within the CI/CD build script 68. In the example of FIG. 3, the breakpoint 74 is inserted immediately prior to the build script step 70(0). However, it is to be understood that the breakpoint 74 may be inserted prior to any of the build script step(s) 70(0)-70(X) within the CI/CD build script 68. Debugging begins with the CI/CD build script 68 being executed within the CI/CD build script debugging environment 66. Upon detecting the breakpoint 74 within the CI/CD build script 68, the CI/CD build script debugging environment 66 pauses execution of the CI/CD build script 68 at the breakpoint 74. The CI/CD build script debugging environment 66 then automatically identifies one of the language-specific debugging environments 72(0)-72(Y) for the next build script step 70(0) (i.e., the language-specific debugging environment 72(0), in the example of FIG. 3) immediately following the breakpoint 74. After automatically identifying the language-specific debugging environment 72(0) for the next build script step 70(0), the CI/CD build script debugging environment 66 launches the language-specific debugging environment 72(0), which then executes the next build script step 70(0) within the language-specific debugging environment 72(0). Once the execution of the next build script step 70(0) within the language-specific debugging environment 72(0) is complete, the execution of the CI/CD build script 68 continues within the CI/CD build script debugging environment 66.

Figure 4:
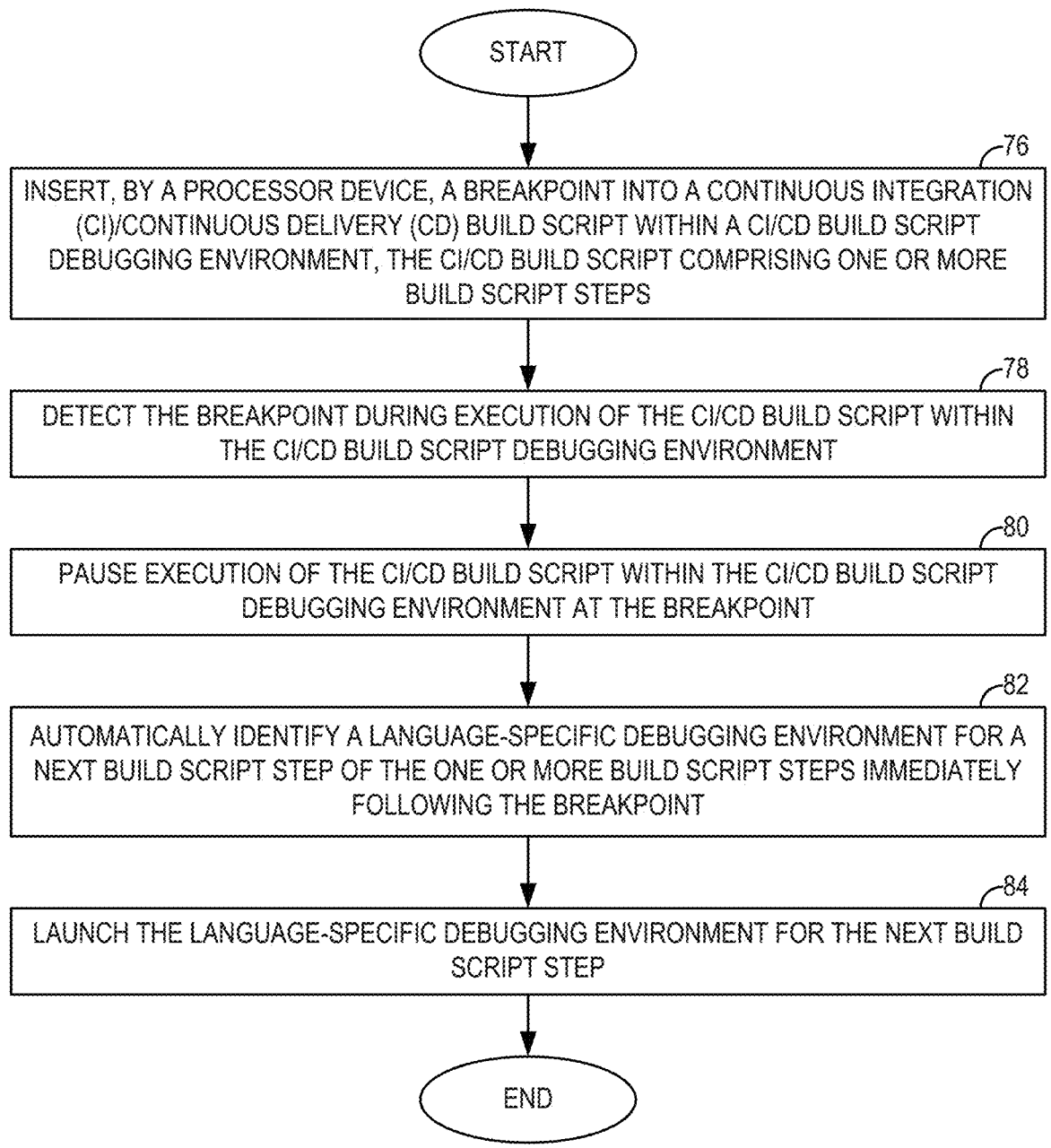
FIG. 4 is a simplified flowchart of the method illustrated in FIG. 2 according to another example.

FIG. 4 is a simplified flowchart of the method illustrated in FIG. 2 according to another example. Elements of FIG. 3 are referenced in describing the operations of FIG. 4 for the sake of clarity. In FIG. 4, operations begin with the processor device 64 inserting the breakpoint 74 into the CI/CD build script 68 within the CI/CD build script debugging environment 66, the CI/CD build script 68 comprising one or more build script steps 70(0)-70(X) (block 76). The processor device 64 then detects the breakpoint 74 during execution of the CI/CD build script 68 within the CI/CD build script debugging environment 66 (block 78). The processor device 64 pauses execution of the CI/CD build script 68 within the CI/CD build script debugging environment 66 at the breakpoint 74 (block 80). The processor device 64 then automatically identifies the language-specific debugging environment 72(0) for the next build script step 70(0) of the one or more build script steps 70(0)-70(X) immediately following the breakpoint 74 (block 82). The processor device 64 launches the language-specific debugging environment 72(0) for the next build script step 70(0) (block 84).

Figure 5:
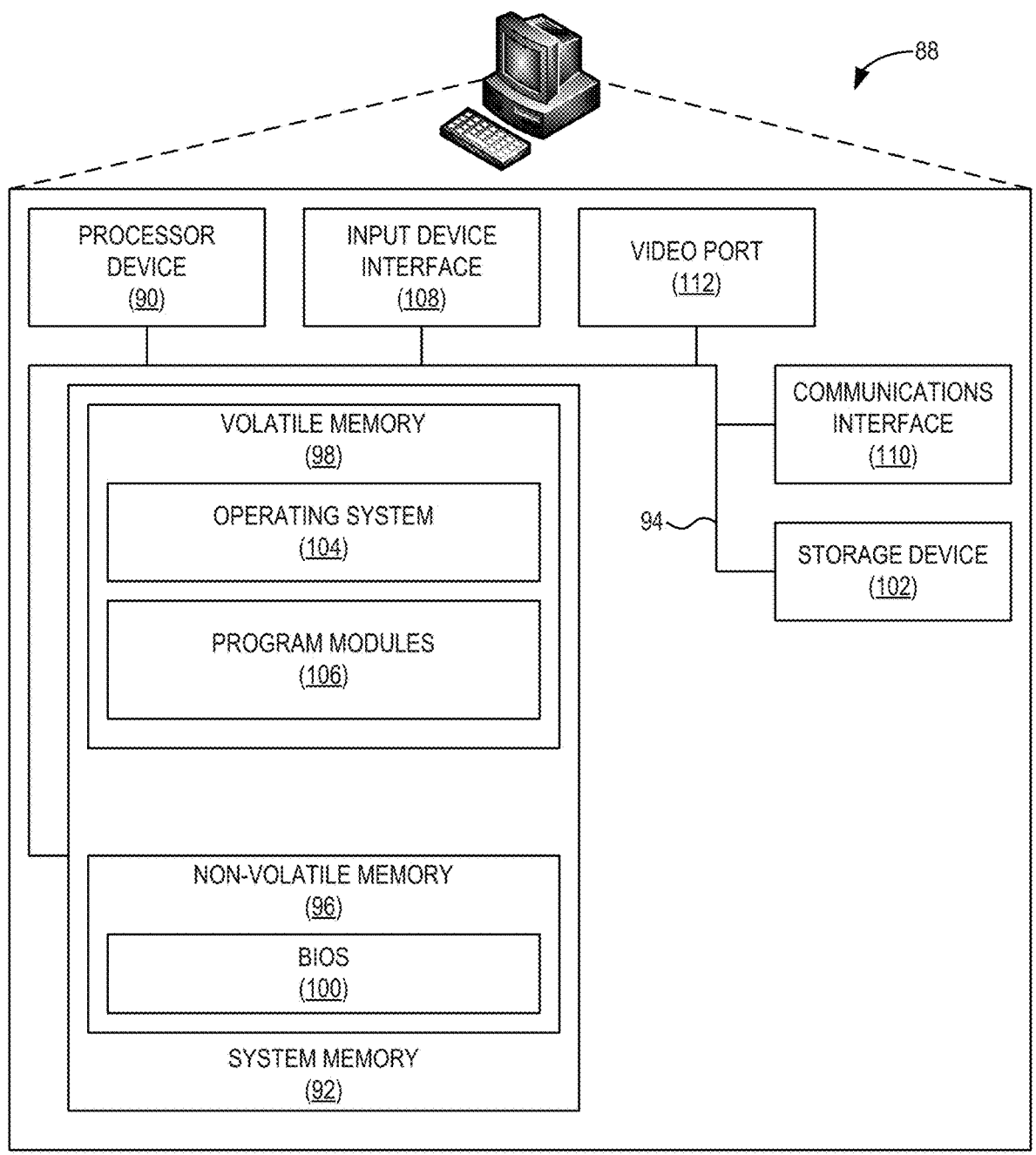
FIG. 5 is a block diagram of a computing device suitable for implementing examples according to one example.

FIG. 5 is a block diagram of a processor-based computing device 88 ("computing device 88"), such as the computing device 10 of FIG. 1, suitable for implementing examples according to one example. The computing device 88 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 88 includes a processor device 90, a system memory 92, and a system bus 94. The system bus 94 provides an interface for system components including, but not limited to, the system memory 92 and the processor device 90. The processor device 90 can be any commercially available or proprietary processor.

The system bus 94 may be any of several types of bus structures that may further interconnect to a memory bus (with or without a memory controller), a peripheral bus, and/or a local bus using any of a variety of commercially available bus architectures. The system memory 92 may include non-volatile memory 96 (e.g., read-only memory (ROM), erasable programmable ROM (EPROM), electrically EPROM (EEPROM), etc.), and volatile memory 98 (e.g., RAM). A basic input/output system (BIOS) 100 may be stored in the non-volatile memory 96 and can include the basic routines that help to transfer information among elements within the computing device 88. The volatile memory 98 may also include a high-speed RAM, such as static RAM, for caching data.

The computing device 88 may further include or be coupled to a non-transitory computer-readable storage medium such as a storage device 102, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 102 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 102 and in the volatile memory 98, including an operating system 104 and one or more program modules 106 which may implement the functionality described herein in whole or in part. It is to be appreciated that the examples can be implemented with various commercially available operating systems 104 or combinations of operating systems 104. All or a portion of the examples may be implemented as a computer program product stored on a transitory or non-transitory computer-usable or computer-readable storage medium, such as the storage device 102, which includes complex programming instructions, such as complex computer-readable program code, to cause the processor device 90 to carry out the steps described herein. Thus, the computer-readable program code can comprise software instructions for implementing the functionality of the examples described herein when executed on the processor device 90. The processor device 90 may serve as a controller, or control system, for the computing device 88 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 90 through an input device interface 108 that is coupled to the system bus 94 but can be connected by other interfaces, such as a parallel port, an Institute of Electrical and Electronic Engineers (IEEE) 1394 serial port, a Universal Serial Bus (USB) port, an IR interface, and the like.

The computing device 88 may also include a communications interface 110 suitable for communicating with a network as appropriate or desired. The computing device 88 may also include a video port 112 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
    inserting, by a processor device, a breakpoint into a continuous integration (CI)/continuous delivery (CD) build script within a CI/CD build script debugging environment, the CI/CD build script comprising one or more build script steps;
    detecting the breakpoint during execution of the CI/CD build script within the CI/CD build script debugging environment;
    pausing the execution of the CI/CD build script within the CI/CD build script debugging environment at the breakpoint;
    automatically identifying a language-specific debugging environment for a next build script step of the one or more build script steps immediately following the breakpoint; and
    launching the language-specific debugging environment for the next build script step.

2. The method of claim 1, further comprising executing the next build script step within the language-specific debugging environment by inserting a breakpoint at the beginning of an executable file corresponding to the next build script step within the language-specific debugging environment.

3. The method of claim 2, further comprising maintaining one or more mappings of a corresponding one or more language-specific debugging environments to a corresponding one or more breakpoint syntaxes;
    wherein inserting the breakpoint at the beginning of the executable file corresponding to the next build script step within the language-specific debugging environment is based on a mapping of the one or more mappings corresponding to the language-specific debugging environment for the next build script step.

4. The method of claim 2, wherein inserting the breakpoint at the beginning of the executable file corresponding to the next build script step comprises inserting the breakpoint using an application programming interface (API) exposed by the language-specific debugging environment for the next build script step.

5. The method of claim 1, further comprising resuming execution of the CI/CD build script within the CI/CD build script debugging environment, responsive to a first user input.

6. The method of claim 1, further comprising executing a build script step of the one or more build script steps without launching a language-specific debugging environment, responsive to a second user input.

7. The method of claim 1, further comprising receiving a third user input indicating a location of the breakpoint within the CI/CD build script;
wherein inserting the breakpoint into the CI/CD build script within the CI/CD build script debugging environment is responsive to receiving the third user input.

8. The method of claim 1, wherein automatically identifying the language-specific debugging environment for the next build script step is based on a code scan of an executable file corresponding to the next build script step.

9. The method of claim 1, wherein automatically identifying the language-specific debugging environment for the next build script step is based on a binary examination of a binary executable corresponding to the next build script step.

10. The method of claim 1, wherein automatically identifying the language-specific debugging environment for the next build script step is based on a suffix of an executable file corresponding to the next build script step.

11. A computing device, comprising:
a system memory;
a processor device coupled to the system memory to:
insert a breakpoint into a continuous integration (CI)/continuous delivery (CD) build script within a CI/CD build script debugging environment, the CI/CD build script comprising one or more build script steps;
detect the breakpoint during execution of the CI/CD build script within the CI/CD build script debugging environment;
pause the execution of the CI/CD build script within the CI/CD build script debugging environment at the breakpoint;
automatically identify a language-specific debugging environment for a next build script step of the one or more build script steps immediately following the breakpoint; and
launch the language-specific debugging environment for the next build script step.

12. The computing device of claim 11, wherein the processor device is further to execute the next build script step within the language-specific debugging environment by inserting a breakpoint at the beginning of an executable file corresponding to the next build script step within the language-specific debugging environment.

13. The computing device of claim 12, wherein the processor device is further to maintain one or more mappings of a corresponding one or more language-specific debugging environments to a corresponding one or more breakpoint syntaxes;
wherein to insert the breakpoint at the beginning of the executable file corresponding to the next build script step within the language-specific debugging environment is to insert the breakpoint based on a mapping of the one or more mappings corresponding to the language-specific debugging environment for the next build script step.

14. The computing device of claim 11, wherein to automatically identify the language-specific debugging environment for the next build script step is to automatically identify the language-specific debugging environment based on a code scan of an executable file corresponding to the next build script step.

15. The computing device of claim 11, wherein to automatically identify the language-specific debugging environment for the next build script step is to automatically identify the language-specific debugging environment based on a binary examination of a binary executable corresponding to the next build script step.

16. The computing device of claim 11, wherein to automatically identify the language-specific debugging environment for the next build script step is to automatically identify the language-specific debugging environment based on a suffix of an executable file corresponding to the next build script step.

17. A computer program product stored on a non-transitory computer-readable storage medium and including instructions to cause a processor device to:
insert a breakpoint into a continuous integration (CI)/continuous delivery (CD) build script within a CI/CD build script debugging environment, the CI/CD build script comprising one or more build script steps;
detect the breakpoint during execution of the CI/CD build script within the CI/CD build script debugging environment;
pause the execution of the CI/CD build script within the CI/CD build script debugging environment at the breakpoint;
automatically identify a language-specific debugging environment for a next build script step of the one or more build script steps immediately following the breakpoint; and
launch the language-specific debugging environment for the next build script step.

18. The computer program product of claim 17, wherein to automatically identify the language-specific debugging environment for the next build script step is to automatically identify the language-specific debugging environment based on a code scan of an executable file corresponding to the next build script step.

19. The computer program product of claim 17, wherein to automatically identify the language-specific debugging environment for the next build script step is to automatically identify the language-specific debugging environment based on a binary examination of an binary executable corresponding to the next build script step.

20. The computer program product of claim 17, wherein to automatically identify the language-specific debugging environment for the next build script step is to automatically identify the language-specific debugging environment based on a suffix of an executable file corresponding to the next build script step.

* * * * *